US007715629B2

(12) United States Patent
Abdulkader

(10) Patent No.: US 7,715,629 B2
(45) Date of Patent: May 11, 2010

(54) STYLE AWARE USE OF WRITING INPUT

(75) Inventor: Ahmad A. Abdulkader, Redmond, WA (US)

(73) Assignee: Microsoft Corporation, Redmond, WA (US)

(*) Notice: Subject to any disclaimer, the term of this patent is extended or adjusted under 35 U.S.C. 154(b) by 939 days.

(21) Appl. No.: 11/215,818

(22) Filed: Aug. 29, 2005

(65) Prior Publication Data

US 2007/0047817 A1 Mar. 1, 2007

(51) Int. Cl.
*G06K 9/00* (2006.01)
*G06K 9/22* (2006.01)

(52) U.S. Cl. .................. 382/186; 382/187; 382/188; 382/189; 382/313; 382/314

(58) Field of Classification Search .............. 382/119, 382/186–189, 313–315; 345/158, 173, 179, 345/180–183; 178/18.03, 19
See application file for complete search history.

(56) References Cited

U.S. PATENT DOCUMENTS

| | | | |
|---|---|---|---|
| 6,445,820 B1 * | 9/2002 | Love | 382/187 |
| 6,771,266 B2 | 8/2004 | Lui et al. | |
| 7,193,616 B2 * | 3/2007 | Stavely et al. | 345/173 |
| 7,242,805 B1 * | 7/2007 | Reihani | 382/198 |
| 2003/0152268 A1 | 8/2003 | Seto et al. | |
| 2003/0215139 A1 * | 11/2003 | Shilman et al. | 382/186 |
| 2006/0062475 A1 * | 3/2006 | Li et al. | 382/203 |

OTHER PUBLICATIONS

S. Schimke, C. Vielhauer, P. K. Dutta, T. K. Basu, A. De Rosa, J. Hansen, J. Dittmann, and B. Yegnanarayana, "Cross Cultural Aspects of Biometrics", 2004, Proceedings of Biometrics: Challenges, pp. 27-30.*
International Search Report dated Jan. 9, 2007 in Application No. PCT/US2006/033824.

* cited by examiner

*Primary Examiner*—Brian Q Le
(74) *Attorney, Agent, or Firm*—Workman Nydegger

(57) ABSTRACT

Techniques for processing handwriting input based upon a user's writing style. Some techniques employ the style in which the user writes a single character, while other techniques alternately or additionally employ a group of allographs that form a handwriting style. Some implementations of these techniques, such as those implemented in writing style analysis tool, analyze one or more characters written by a user to identify a community, such as a geographic region or cultural group, to which the user's handwriting style belongs. Other implementations analyze one or more characters of a user's handwriting in order to alternately or additionally categorize the user's handwriting into a particular handwriting style. The writing style analysis tool may then provide the user with a handwriting recognition application specifically configured for that user's personal handwriting style. With still other implementations, the user's handwriting style alternately or additionally is employed to prevent a handwriting recognition application from using an aberrantly written character as training data for improving the recognition process, or to predict how a user writes other characters.

17 Claims, 16 Drawing Sheets

STYLE AWARE USE OF WRITING INPUT

BACKGROUND OF THE INVENTION

Computers are regularly being used for a variety of purposes throughout the world. As computers have become commonplace, computer manufacturers have continuously sought to make them more accessible and user-friendly. One such effort has been the development of natural input methods. For example, speech recognition permits a user to input data into a computer simply by speaking the data out loud. The phonemes of the user's speech then are analyzed to convert it into typewritten text Handwriting recognition alternately allows a user to input data by writing on a digitizer with a stylus to create electronic ink. The computer analyzes the shapes of the ink to convert it into typewritten text.

The advent of handwriting input techniques has been especially beneficial to many computer users. Some users can write characters by hand faster than they can type the same characters using a key board. These users can thus create handwriting input more quickly than keyboard input. Most East Asian language users also find handwriting input handwriting more efficient than keyboard input. East Asian languages typically are written using a pictographic character set having thousands of characters. Even a large keyboard cannot contain enough keys for a user to write in an East Asian language. Thus, a keyboard user is required to tediously convert phonetic characters represented on the keyboard into the desired pictographic characters. With a computer that accepts and recognizes handwriting input, an East Asian language user may now simply write the desired pictographic character directly in electronic ink. Still further, some users employ computers in environments that do not allow for the use of keyboards. For example, a doctor walking rounds in a hospital may create handwriting input where the use of a keyboard would be impractical.

While handwriting input techniques can be very convenient for a variety of users, the usefulness of these techniques largely depends upon their recognition accuracy. Consistently accurate handwriting recognition can be difficult to obtain, however, as different users will write the same character using a wide variety of different shapes.

To address the issue of handwriting recognition, some software developers have created handwriting recognition software applications that are generic to a wide variety of users. These software applications employ one or more handwriting recognition techniques that are common to all forms of handwriting for a language. For example, some of these techniques may compare a handwritten character to a set of character prototypes to determine which prototype the handwritten character most closely resembles. The set of prototypes will then include one or more conventional allographs for each character in the user's alphabet. While these generic recognition techniques will recognize handwriting "out of the box" for a wide variety of users, they typically will not provide a high recognition accuracy rate for any particular user. Moreover, the accuracy of these types of recognition techniques usually will not improve over time.

Some software developers alternate to provide personalized handwriting recognition software applications that will learn to recognize a specific individual's handwriting. These applications typically require a user to input a large amount of handwriting data during the learning process, however, as a result, some of these handwriting recognition software applications are not very accurate "out of the box." Further, many users are reluctant to invest the time required to properly train this type of software to recognize the user's handwriting. In addition, these personalized handwriting recognition software applications are susceptible to overtraining. As the software continues to refine its recognition process over time, it may include aberrant character shapes written by the user in its training data. These occasionally abnormal character shapes, uncommon to the user's typically writing, may actually reduce the application's recognition accuracy over time.

BRIEF SUMMARY OF THE INVENTION

Various aspects of the invention relate to techniques for processing handwriting input based upon a user's writing style. Some aspects of the invention may employ the style in which the user writes a single character. Other aspects of the invention may alternately or additionally employ a group of allographs that form a handwriting style.

For example, some implementations of the invention may analyze one or more characters written by a user to identify a community, such as a geographic region or cultural group, to which the user's handwriting style belongs. With these implementations, the user can then be provided with a handwriting recognition application tailored to recognize the handwriting styles used by that community. Other implementations of the invention may analyze one or more characters of a user's handwriting in order to alternately or additionally categorize the user's handwriting into a particular handwriting style. The user can then be provided with a handwriting recognition application specifically configured for that user's personal handwriting style. Advantageously, both types of handwriting recognition applications may provide greater recognition accuracy than a generic handwriting recognition application without requiring the user to submit a large amount of training data.

With still other implementations of the invention, the user's handwriting style alternately or additionally can be employed to prevent a handwriting recognition application from using an aberrantly written character as training data for improving the recognition process. Some examples of the invention then may alternately or additionally analyze one or more of a user's allographs to predict how a user writes other characters. Rather than requiring the user to submit training data corresponding to each of those characters, for example, these implementations may instead prompt the user to confirm how he or she writes those other characters. These implementations may, e.g., simply have the user choose between allographs belonging to the same writing style as the analyzed allographs.

Still other implementations of the invention may alternately or additionally analyze a user's writing style to determine whether the user writes right-handed or left-handed. These implementations then may, for example, configure one or more user interfaces of a computer to correspond with the user's "handedness."

These and other features and advantages of different implementations of the invention will be described in more detail below.

BRIEF DESCRIPTION OF THE DRAWINGS

FIGS. 1A and 1B show model handwriting styles typically used to teach handwriting in schools.

FIGS. 13 and 14 show the testing error rates for each of three handwriting recognition applications using different training techniques.

DETAILED DESCRIPTION OF THE INVENTION

Writing Style

Figure 2:
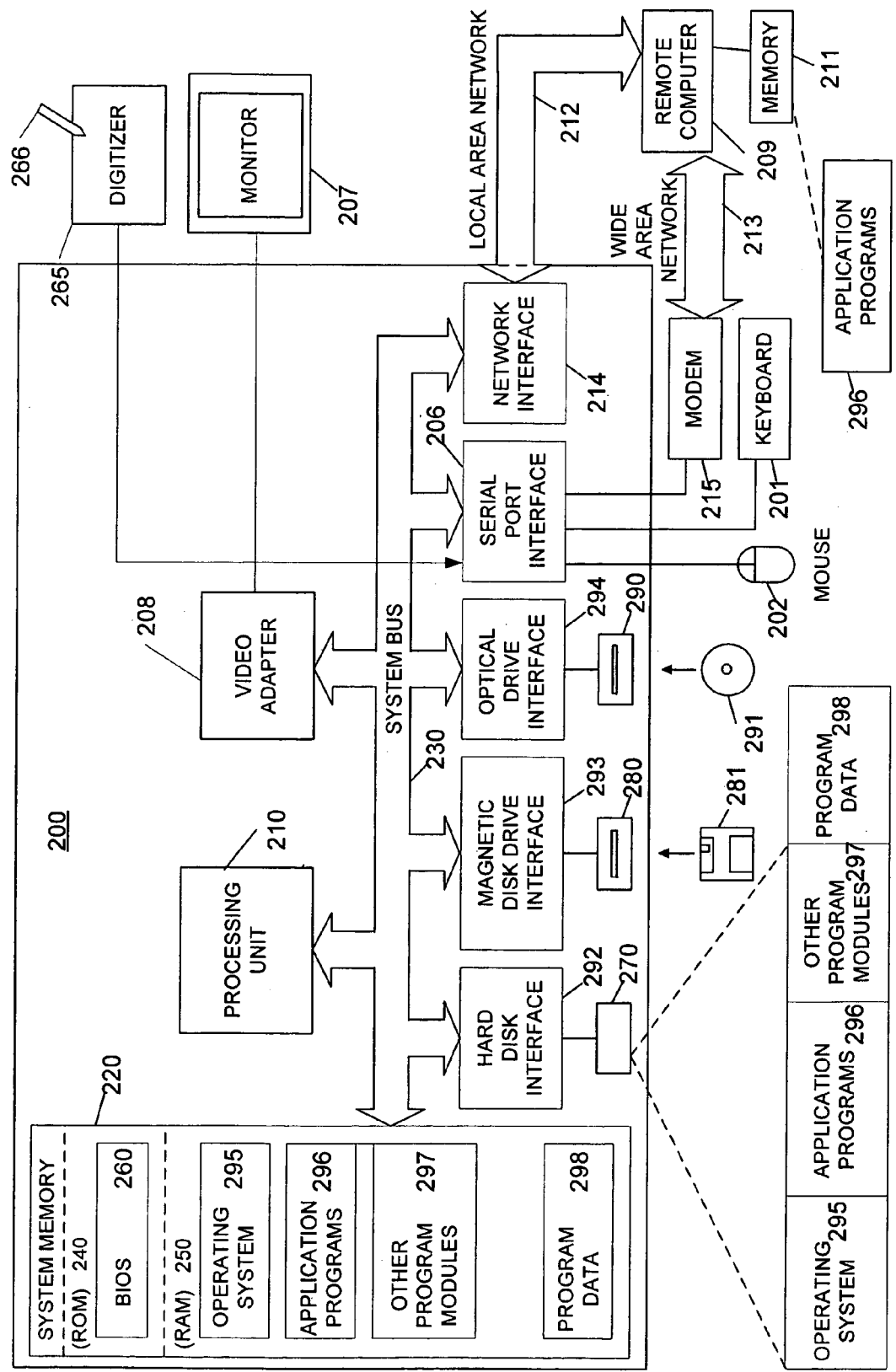
FIGS. 2 and 3 show examples of an operating environment that can be used to implement handwriting recognition techniques according to various examples of the invention.

Various aspects of the invention relate to employing a user's writing style to improve writing input techniques. Some examples of the invention may employ the style in which the user writes a single character, referred to hereafter as an "allograph." As used hereafter, the term "character" generically refers both to an individual letter, number or other mark, and to a ligature (i.e., a single shape or glyph that represents two or more underlying letters, numbers, or other marks). The allograph of a character may be determined for example, by the number of strokes that a user makes to write the character, the order in which each stroke is written, and the direction in which each stroke is written.

Figure 1A:
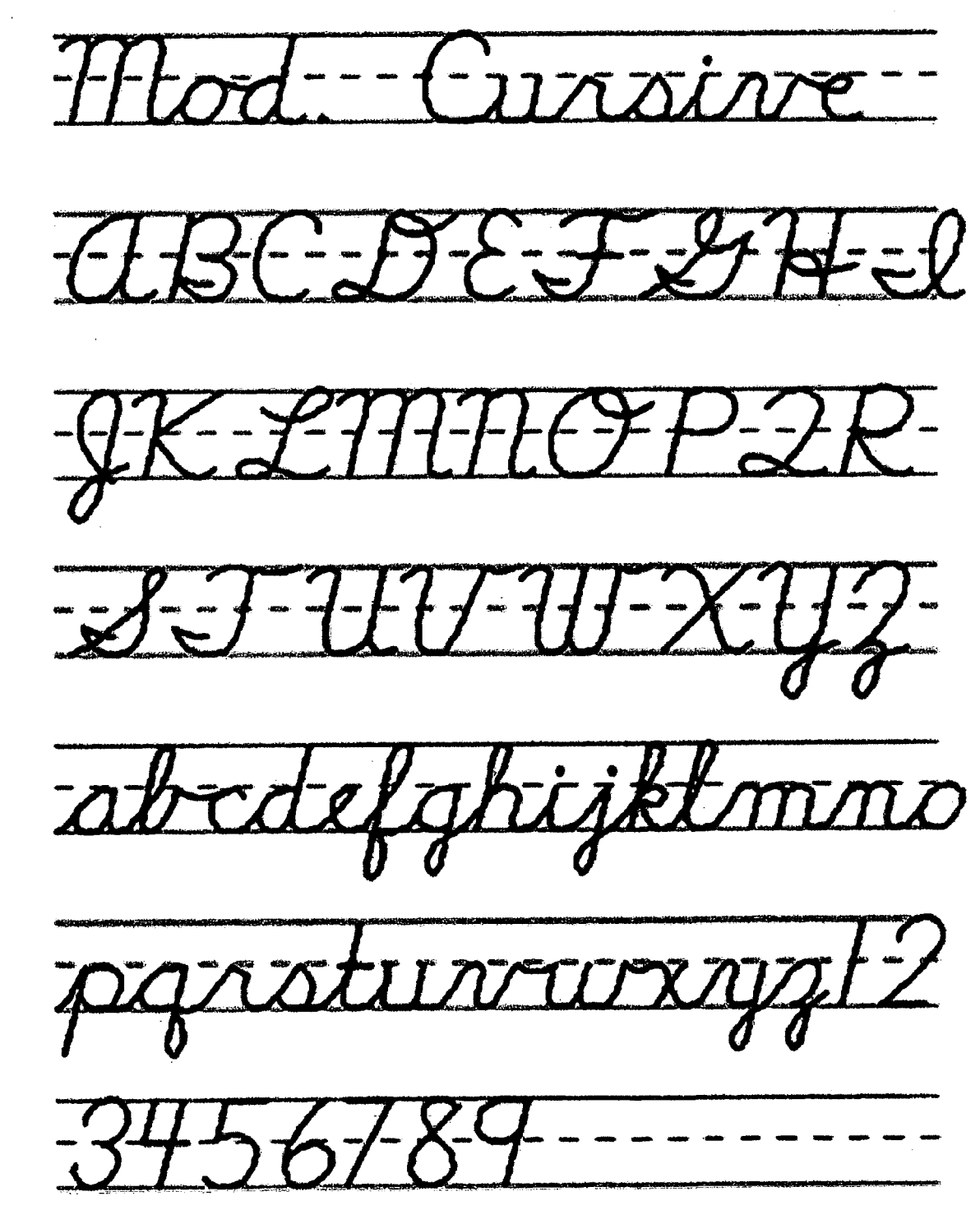
Figure 1B:
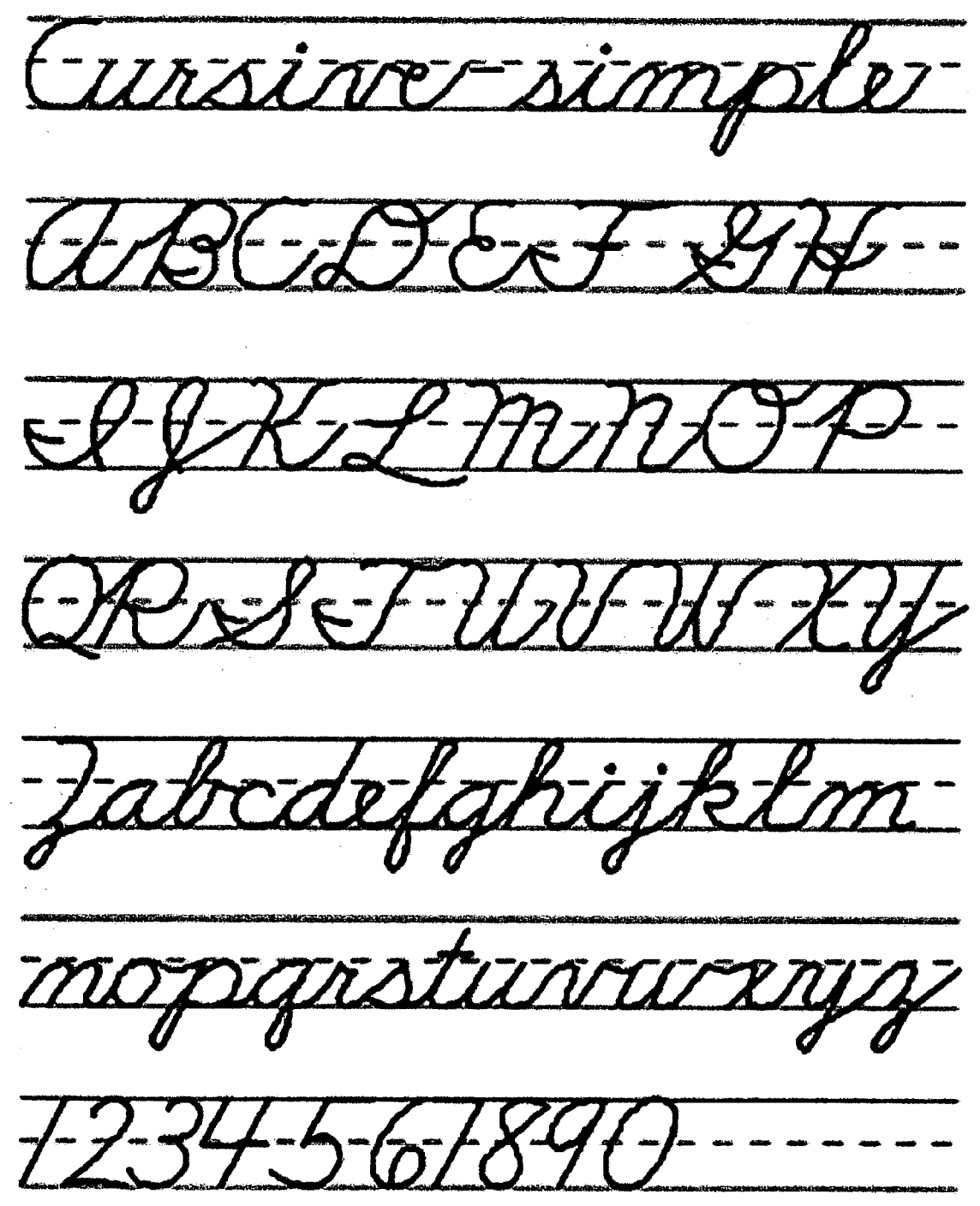

Other aspects of the invention may alternately or additionally employ a group of allographs that form a handwriting style. For example, FIG. 1A illustrates the model Modern Cursive handwriting style, while FIG. 1B illustrates the model Simple Cursive handwriting style. As can be seen from these figures, both model handwriting styles share a similar allograph for the capital letter "T" (although the allograph in the Simple Cursive handwriting style is slightly more angled than the allograph in the Modern Cursive handwriting style). These handwriting styles have significantly different allographs, however, for the small letter "p." As used herein, the term "writing style" generically refers to a single allograph, a group of allographs, or a handwriting style made up of multiple allographs.

The handwriting styles illustrated in FIGS. 1A and 1B are model handwriting styles typically used to teach handwriting to new writers in schools. A more experienced writer, however, will have developed his or her own idiosyncratic handwriting style that may include both manuscript and cursive writing. This idiosyncratic handwriting style typically will combine allograph characteristics from a variety of different model handwriting styles with eccentric allograph characteristics that do not belong to any particular model handwriting style. Once a writer develops a personalized handwriting style, it usually will not change over time. Thus, a user's idiosyncratic handwriting style will have both unique characteristics and some-characteristics that are shared with one or more other writers. The unique set of characteristics may be referred to as the set of individual characteristics, while the shared characteristics can be referred to as the set of "style" characteristics. Thus, as will be explained in more detail below, two or more idiosyncratic handwriting styles can be grouped together into a more inclusive handwriting style based upon one or more shared "style" characteristics.

Implementation Environment

As will be appreciated by those of ordinary skill in the art, various examples of the invention may be implemented using analog circuitry. More commonly, however, aspects of the invention will be implemented using a programmable computing device executing programming or "software" instructions. Accordingly, a generic example of a computing device environment that may be employed to implement various examples of the invention will now be described with regard to FIGS. 2 and 3.

More particularly, FIG. 2 illustrates one example of a general-purpose digital computing environment that can be used to implement various examples of the invention. In particular, FIG. 2 shows a schematic diagram of a computer 200. The computer 200 typically includes at least some form of computer readable media. Computer readable media can be any available media that can be accessed by the computer 200. By way of example, and not limitation, computer readable media may comprise computer storage media and communication media. Computer storage media includes volatile and non-volatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, punched media, holographic storage, or any other medium which can be used to store the desired information and which can be accessed by the computer 200.

Communication media typically embodies computer readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

As shown in FIG. 2, the computer 200 includes a processing unit 210, a system memory 220, and a system bus 230 that couples various system components including the system memory 220 to the processing unit 210. The system bus 230 may be any of several types of bus structures including a memory bus or memory controller, a peripheral bus, and a local bus using any of a variety of bus architectures. The system memory 220 may include read only memory (ROM) 240 and random access memory (RAM) 250.

A basic input/output system (BIOS) 260 contains the basic routines that help to transfer information between elements within the computer 200, such as during start-up, is stored in the ROM 240. The computer 200 also may include a hard disk drive 270 for reading from and writing to a hard disk (not shown), a magnetic disk drive 280 for reading from or writing to a removable magnetic disk 281, and an optical disk drive 290 for reading from or writing to a removable optical disk 291, such as a CD ROM, DVD ROM, or other optical media. The hard disk drive 270, magnetic disk drive 280, and optical disk drive 290 are connected to the system bus 230 by a hard disk drive interface 292, a magnetic disk drive interface 293, and an optical disk drive interface 294, respectively. These drives and their associated computer-readable media provide nonvolatile storage of computer-readable instructions, data structures, program modules, and other data for the personal computer 200. It will be appreciated by those skilled in the art that other types of computer-readable media that can store data that is accessible by a computer, such as magnetic cassettes, flash memory cards, digital video disks, Bernoulli cartridges, random access memories (RAMs), read only memories (ROMs), and the like, may also be used in the example operating environment.

A number of program modules can be stored on the hard disk drive 270, magnetic disk 281, optical disk 291, ROM 240, or RAM 250, including an operating system 295, one or more application programs 296, other program modules 297, and program data 298. A user can enter commands and information into the computer 200 through input devices, such as a keyboard 201 and pointing device 202 (such as a mouse). Other input devices (not shown) may include a microphone, joystick, game pad, satellite dish, scanner, or the like. These and other input devices are often connected to the processing unit 210 through a serial port interface 206 that is coupled to the system bus 230, but they also may be connected by other interfaces, such as a parallel port, game port, or a universal serial bus (USB), and the like. Further still, these devices may be coupled directly to the system bus 230 via an appropriate interface (not shown).

A monitor 207 or other type of display device also may be connected to the system bus 230 via an interface, such as a video adapter 208. In addition to the monitor 207, personal computers typically include other peripheral output devices (not shown), such as speakers and printers. In one example, a pen digitizer 265 and accompanying pen or stylus 266 are provided in order to digitally capture freehand input. Although a connection between the pen digitizer 265 and the serial port interface 206 is shown in FIG. 2, in practice, the pen digitizer 265 may be directly coupled to the processing unit 210, or it may be coupled to the processing unit 210 in any suitable manner, such as via a parallel port or another interface and the system bus 230 as is known in the art. Furthermore, although the digitizer 265 is shown separate from the monitor 207 in FIG. 2, the usable input area of the digitizer 265 may be co-extensive with the display area of the monitor 207. Further still, the digitizer 265 may be integrated in the monitor 207, or it may exist as a separate device overlaying or otherwise appended to the monitor 207.

The computer 200 can operate in a networked environment using logical connections to one or more remote computers, such as a remote computer 209. The remote computer 209 can be a server, a router, a network PC, a peer device or other common network node, and it typically includes many or all of the elements described above relative to the computer 200, although for simplicity, only a memory storage device 211 has been illustrated in FIG. 2. The logical connections depicted in FIG. 2 include a local area network (LAN) 212 and a wide area network (WAN) 213. Such networking environments are commonplace in offices, enterprise-wide computer networks, intranets, and the Internet, using both wired and wireless connections.

When used in a LAN networking environment, the computer 200 is connected to the local area network 212 through a network interface or adapter 214. When used in a WAN networking environment, the personal computer 200 typically includes a modem 215 or other means for establishing a communications link over the wide area network 213, such as the Internet. The modem 215, which may be internal or external to the computer 200, may be connected to the system bus 230 via the serial port interface 206. In a networked environment, program modules depicted relative to the personal computer 200, or portions thereof, may be stored in the remote memory storage device.

It will be appreciated that the network connections shown are examples and other techniques for establishing a communications link between the computers can be used. The existence of any of various well-known protocols such as TCP/IP, Ethernet, FTP, HTTP, UDP, and the like is presumed, and the system can be operated in a user-server configuration to permit a user to retrieve web pages from a web-based server. Any of various conventional web browsers can be used to display and manipulate data on web pages.

Although the FIG. 2 environment shows one example of an operating environment for various embodiments of the invention, it should be understood that other computing environments also may be used. For example, one or more examples of the present invention may use an environment having fewer than all of the various aspects shown in FIG. 2 and described above, and these aspects may appear in various combinations and subcombinations that will be apparent to one of ordinary skill.

Figure 3:
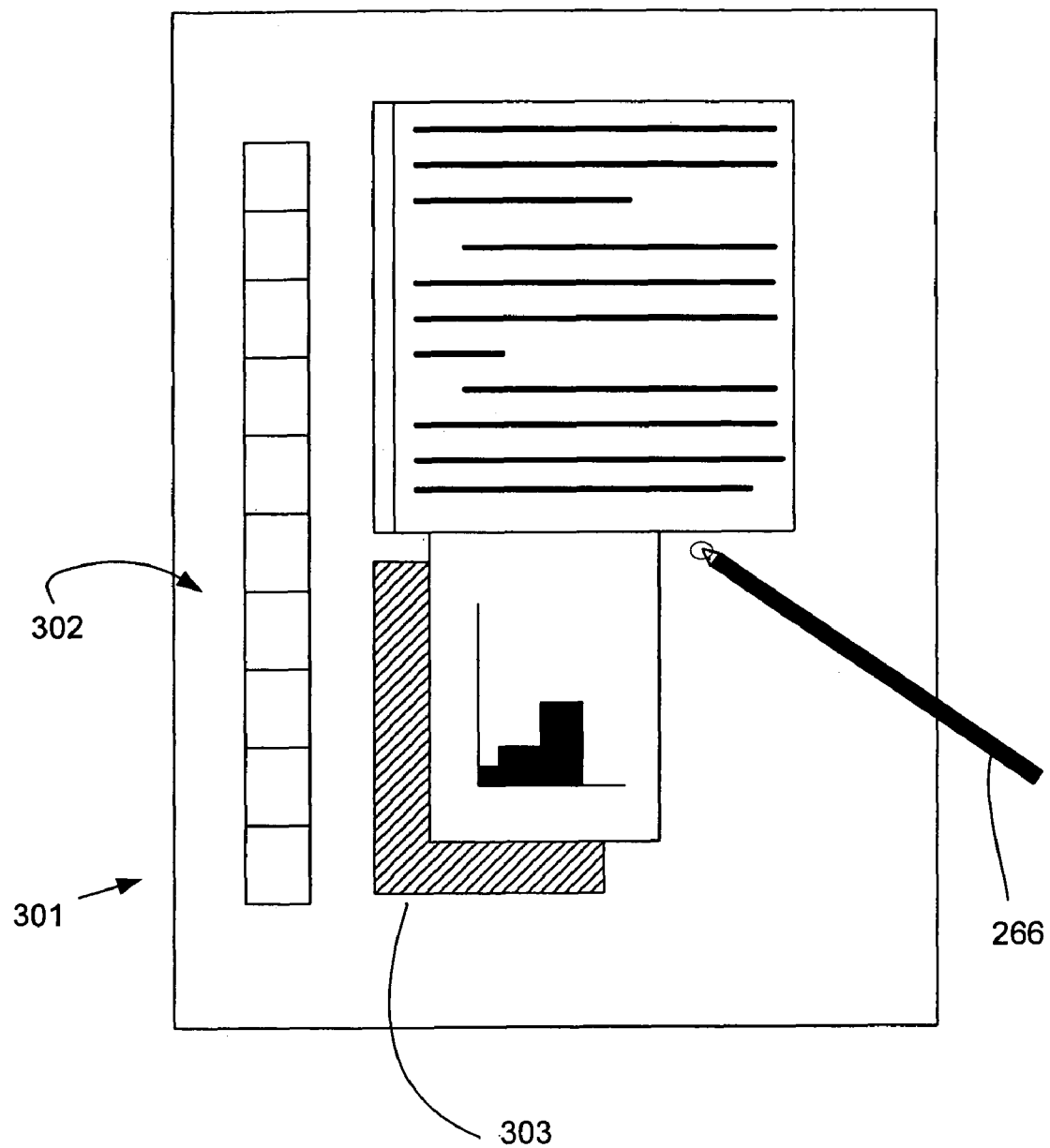

FIG. 3 illustrates a pen-based personal computer (PC) 301 that can be used in accordance with various aspects of the present invention. Any or all of the features, subsystems, and functions in the system of FIG. 2 can be included in the computer 301 of FIG. 3. The pen-based personal computer system 301 includes a large display surface 302, e.g., a digitizing flat panel display, such as a liquid crystal display (LCD) screen, on which a plurality of graphical user interfaces 303, such as windowed graphical user interfaces, is displayed. Using stylus 266, a user can select, highlight, and write on the digitizing display area. Examples of suitable digitizing display panels include electromagnetic pen digitizers, such as pen digitizers available from Mutoh Co. (now known as FinePoint Innovations Co.) or Wacom Technology Co. Other types of pen digitizers, e.g., optical digitizers, and touch-sensitive digitizers may also be used. The pen-based computing system 301 interprets gestures made using stylus 266 in order to manipulate data, enter text, and execute conventional computer application tasks, such as creating, editing, and modifying spreadsheets, word processing programs, and the like.

The stylus 266 may be equipped with buttons or other features to augment its capabilities. In one example, a stylus 266 could be implemented as a "pencil" or "pen", in which one end constitutes a writing portion. The other end of the stylus 266 then constitutes an "eraser" end, which, when moved across the display, indicates portions of electronic ink on the display that are to be erased. Other types of input devices, such as a mouse, trackball, keyboard, or the like also could be used. Additionally, a user's own finger could be used for selecting or indicating portions of the displayed image if the display is a touch-sensitive or proximity-sensitive display. Consequently, the term "user input device," as used herein, is intended to have a broad definition and encompasses many variations on well-known input devices.

In addition to use with full performance pen-based computing systems or "tablet PCs" (e.g., convertible laptops or "slate" type tablet PCs), aspects of this invention can be used in conjunction with other types of pen-based computing systems and/or other devices that accept data as electronic ink and/or accept electronic pen or stylus input, such as: handheld or palm-top computing systems; personal digital assistants; pocket personal computers; mobile and cellular telephones, pagers, and other communication devices; watches; appliances; and any other devices or systems that include a monitor or other display device and/or a digitizer that presents printed or graphical information to users and/or allows input using an electronic pen or stylus, or which can process electronic ink collected by another device (e.g., a conventional desktop computer that can process electronic ink collected by a tablet PC).

Writing Style Analysis Tool

Figure 4:
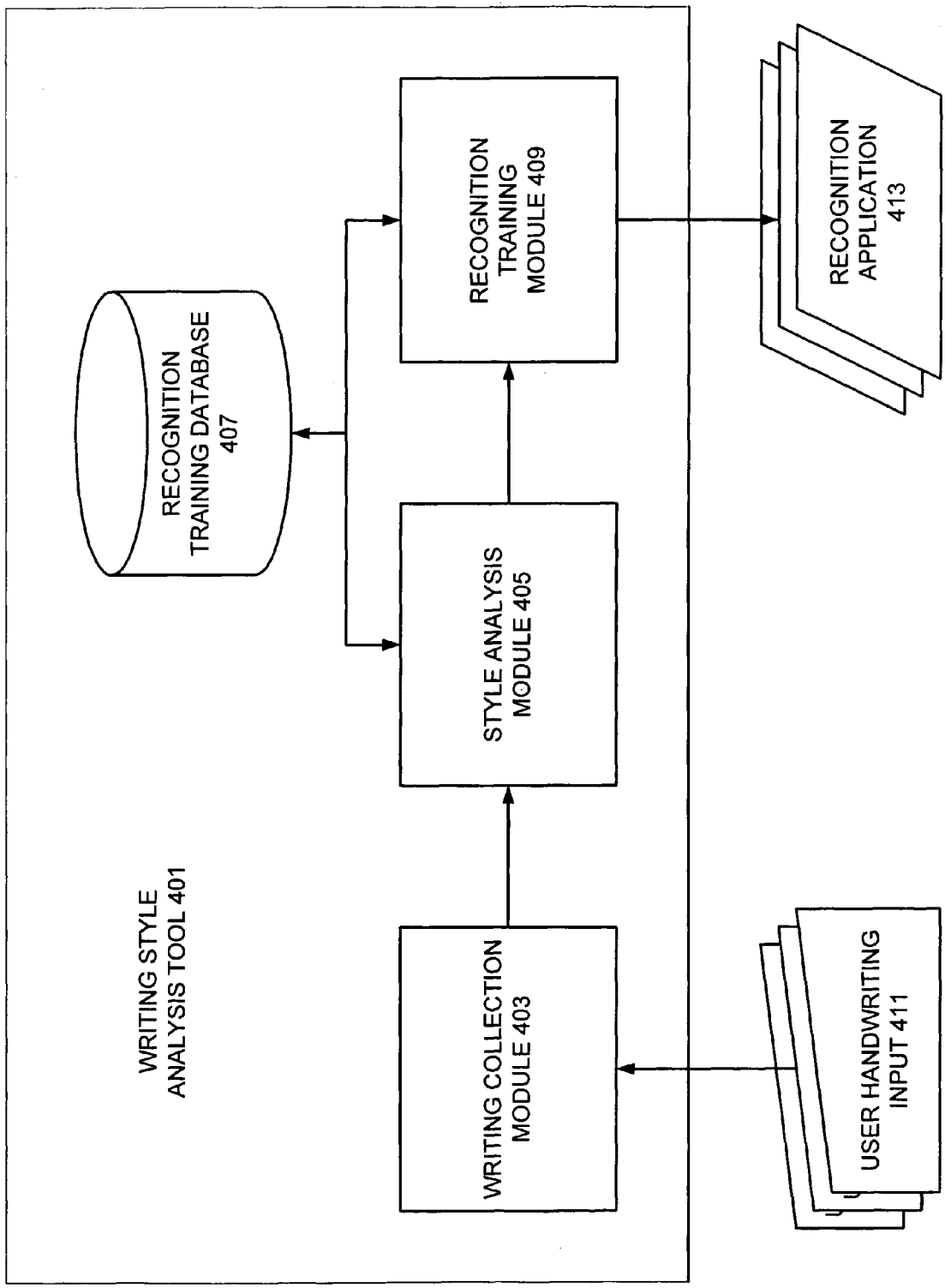
FIG. 4 illustrates a writing style analysis tool that may be implemented according to various examples of the invention.

FIG. 4 illustrates a writing style analysis tool 401 that may be implemented according to various examples of the invention. As shown in this figure, the writing style analysis tool 401 includes a writing collection module 403, a style analysis module 405, a recognition training database 407, and a recognition training module 409. As will be explained in detail below, the writing style analysis tool 401 receives handwriting data input from a variety of users 411, and in turn provides handwriting recognition applications 413 to one or more users that are customized for recipient user's handwriting style.

As shown in FIG. 4, the writing style analysis tool 401 may be accessible to a variety of users. Thus, with various examples of the invention, at least the writing collection module 403 may be implemented on a server computer accessible to multiple users over one or more networks, such as the Internet. In addition to collecting a user's handwriting, the writing collection module 403 may also include additional personal information regarding the user. For example, the writing collection module 403 may also obtain the user's handedness (i.e., whether the users writes right-handed or left-handed). The writing collection module 403 may alternately or additionally obtain information regarding one or more communities to which the user belongs, such as the user's geographical, religious and/or cultural information. Thus, the writing collection module 403 may ascertain the country or other geographical region where the user learned to write, if the user was educated in a religious school, or whether the user belongs to a distinct cultural group.

As will be explained in more detail below, the style analysis module 405 organizes the received handwriting samples 411 into related groups or "clusters" based upon similarities in their characteristics. As will be appreciated from the foregoing description, each cluster can be defined as a handwriting style common to one or more users whose handwriting samples are included in the cluster. With various examples of the invention, two separate techniques can be employed to organize the received handwriting samples 411 into clusters: a top down approach of detecting coarse sub-styles, or a bottom-up clustering approach.

In the illustrated example, the style analysis module 405 employs the bottom up approach, as the information obtained using this approach can be directly employed by the recognition training module 409, as will be apparent from the discussion below. Using this approach, a clustering $C$ of a handwriting sample data set $X=\{x^1, x^2, \ldots, x^M\}$ defines a partitioning of the data into a set $\{c^1, c^2, \ldots, c^K\}$ of disjoint sets, such that $\cup_{k=1}^{K} c^k = X$. The clustering $C$ is computed independently for every letter in the handwriting sample 411.

With various examples of the invention, the style analysis module 405 uses a hierarchical clustering algorithm that produces a hierarchy of nested clusterings $[C_1, C_2, \ldots, C_M]$ such that $C_{m-1}$ is a subset of $C_m$. This hierarchy is built in M steps, where a clustering at step m is produced from the clustering produced at step m−1. At step 1, every member in the sample set X represents a cluster of its own. Using a dissimilarity function $D(c^k, c^{k'})$ of two clusters, the following algorithm is applied. First, initialize $C_1 = \{\{x^1\}, \{x^2\}, \ldots, \{x^M\}\}$. Second, for m=2, ..., M: obtain the new clustering $C_m$ by merging clusters $c^k_{min}$ and $c^{k'}_{min}$ of $C_{m-1}$ by where $(k_{min}, k'_{min}) = \arg\min_{(k,k'), k \neq k'} D(c^k, c^{k'})$.

The cluster dissimilarity function $D(c^k, c^{k'})$ may be based, for example, on an ink sample dissimilarity function $D(x^k, x^{k'})$. While any desired dissimilarity function may be employed to determine a difference between ink samples, various examples of the invention may employ an elastic matching algorithm (also known as a dynamic timing warping algorithm) to determine how similar one ink sample is to another ink sample.

Thus, for ink samples k (which is made up of S strokes) and k' (made up of S' strokes), $$D(x^k, x^{k'}) = \infty \text{ if } S \neq S', \text{ and}$$

$$D(x^k, x^{k'}) = \frac{\sum_{n=1}^{N} |P_n, P'_n|}{S} \text{ if } S = S',$$

where P and P' are the corresponding re-sampled co-ordinate vectors of samples k, k' and N is the number of sampling points. An element p in the in the vector P has 3 co-ordinates (x, y, Θ) where x, y are the Cartesian co-ordinates of the point p and Θ is the estimate of the slope at the same point.

From this definition, it will be appreciated that ink samples with different stroke counts will not be merged in the same cluster until the very end of the process. At that point, the merging would have actually stopped.

Thus, $$D(c^k, c^{k'}) = \arg\max_{\forall x^k \in c^k, \forall x^{k'} \in c^{k'}} D(x^k, x^{k'})$$

The decision to use the maximum value, rather than average or minimum values, and to use define the distance between two ink samples with a different number of strokes to ∞ gives favor to compact clusters.

An ink sample in a cluster is selected to be the cluster representative. The chosen representative for every cluster may be, for example, the median center of the cluster. The median center $x^{-k}$ for cluster $c^k$ is defined as the ink sample with the smallest median distance with respect to the remaining cluster member ink samples:

$$\underset{x \in c^k, x \neq x^{-k}}{med} (D(x^{-k}, x)) \leq \underset{x \in c^k, x \neq x'}{med'} (D(x', x)), \forall x' \in c^k$$

Figure 5:
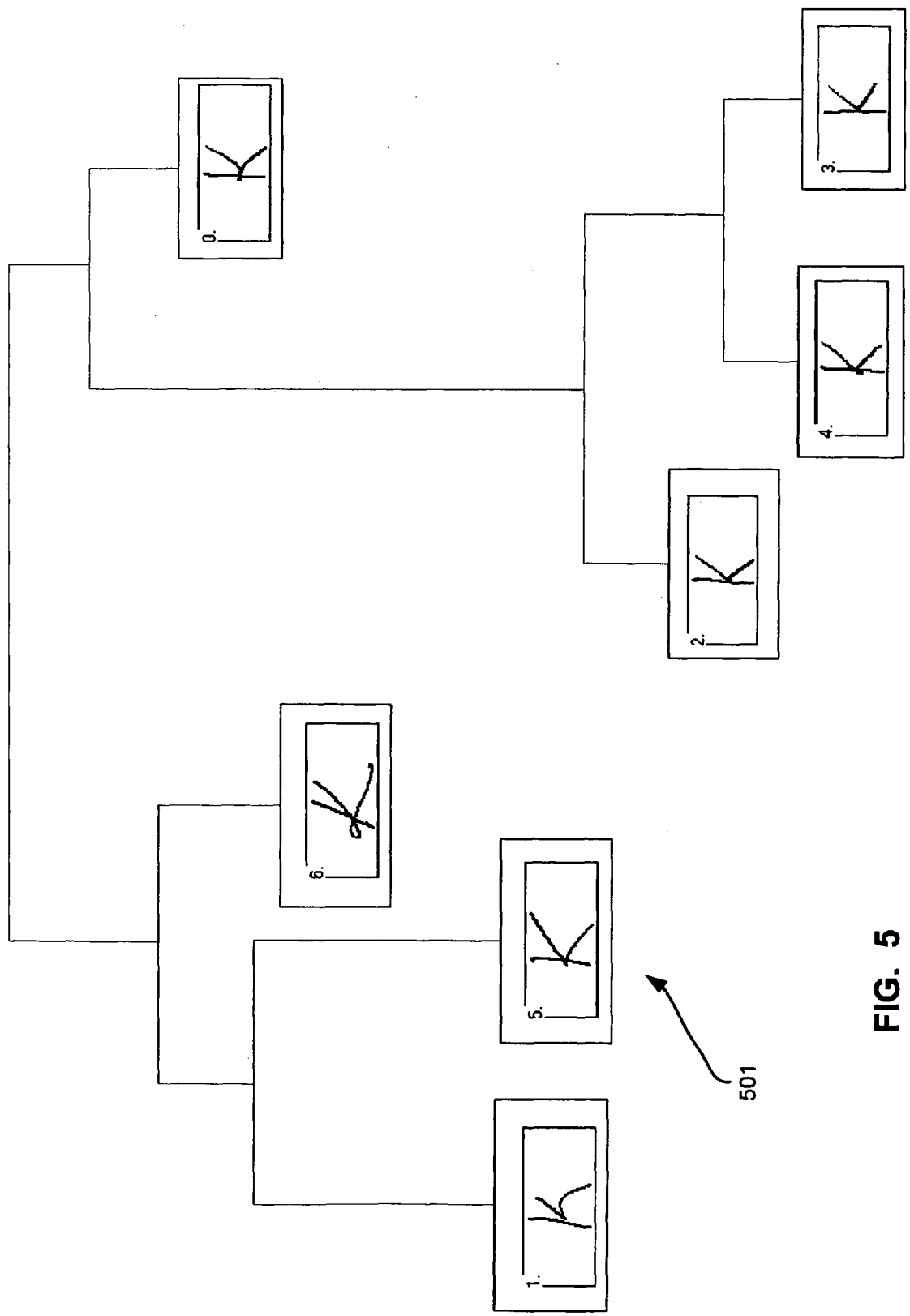
FIG. 5 shows one example of clustering for various ink samples of the letter K.

The results of the clustering for every character can be visualized as a binary tree (also referred to as a "dissimilarity dendrogram"). FIG. 5 shows one example of a resulting dendrogram 501 for various ink samples of the letter K. In this figure, the strokes are color coded such that the stroke's color indicates the order in which it was written: (1) red, (2) green, (3) blue and (4) magenta. Each stroke also is illustrated such that the stroke becomes progressively lighter from its starting point to its end point.

With various examples of the invention, the number of clusters for every letter may be defined as a desired threshold $D_{max}$ above which no further merging of clusters occurs. The active clusters remaining at the time that merging stops may then be defined as the various character styles or allographs of the corresponding character. Accordingly, the number of resulting styles will be different from one letter to the other depending on the diversity of the character shapes.

Determination of a User's Handedness

Figure 6:
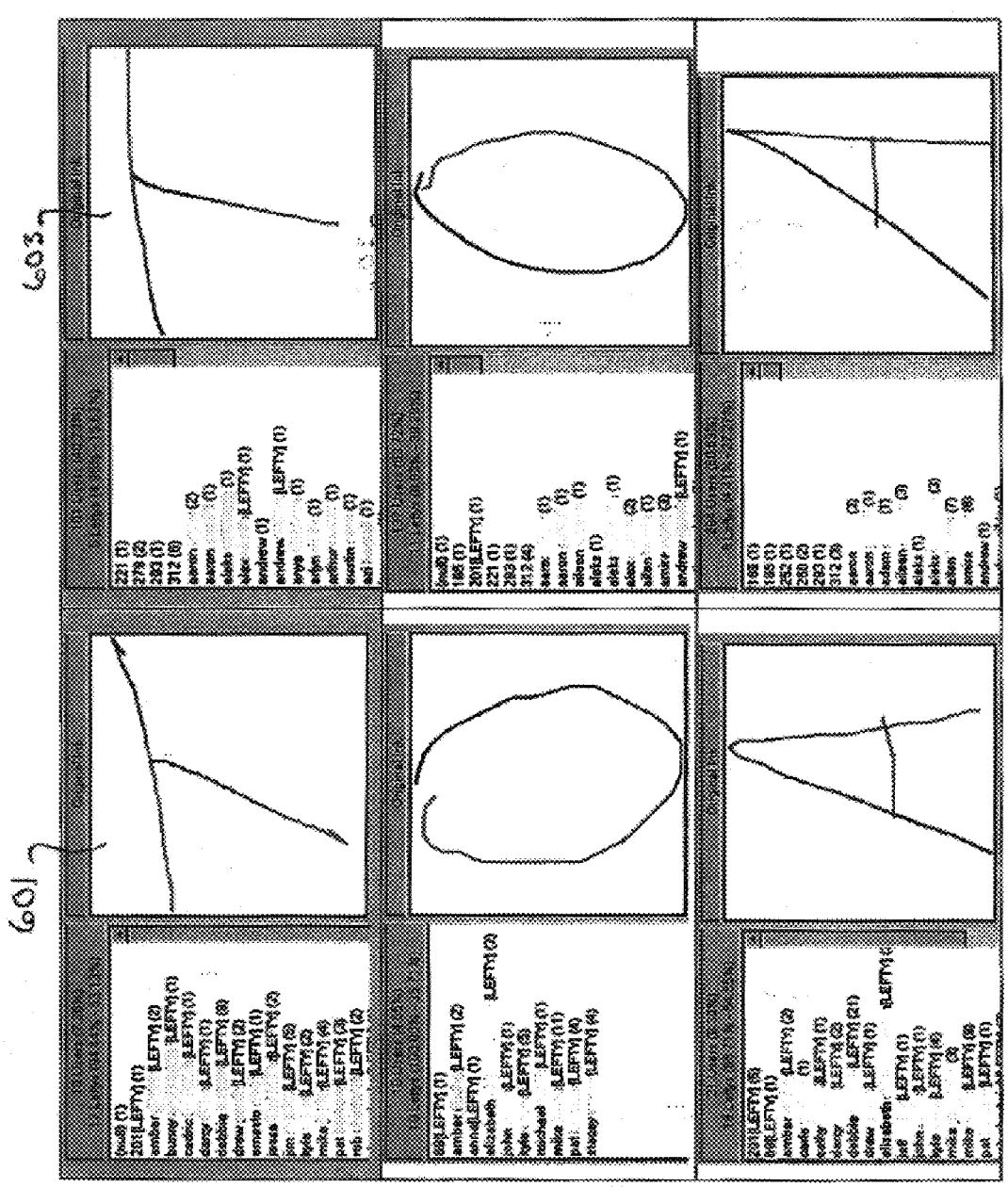
FIG. 6 illustrates various handedness revealing allographs and the handedness statistics of their corresponding writers.

With some implementations of the invention, the recognition training module 409 may use the data created by the style analysis module 405 to create a writing recognition application that recognizes the handedness of the writer. As previously noted, in addition to the shape of the strokes in a character, various examples of the invention will also take into account the direction of each stroke and the order in which each stroke is written when defining an allograph. By employing an example of the invention, a very high correlation was subjectively found between specific allographs and the handedness of the writers that employ those allographs. These allographs thus may serve as handedness revealing allographs. FIG. 6 shows some of these allographs and the handedness statistics of their corresponding writers.

As will be seen from this figure, various allographs are written almost exclusively by writers of a specific handedness. For example, 94.44% of the writers who wrote the letter T in the style 601 (with the cross-bar being written from right-to-left rather than left-to-right) write with their left-hand. Contrarily, only 4.95% of the writers who wrote the letter T in the style 603 (with the cross-bar being written from left-to-right) write with their left-hand.

Figure 7:
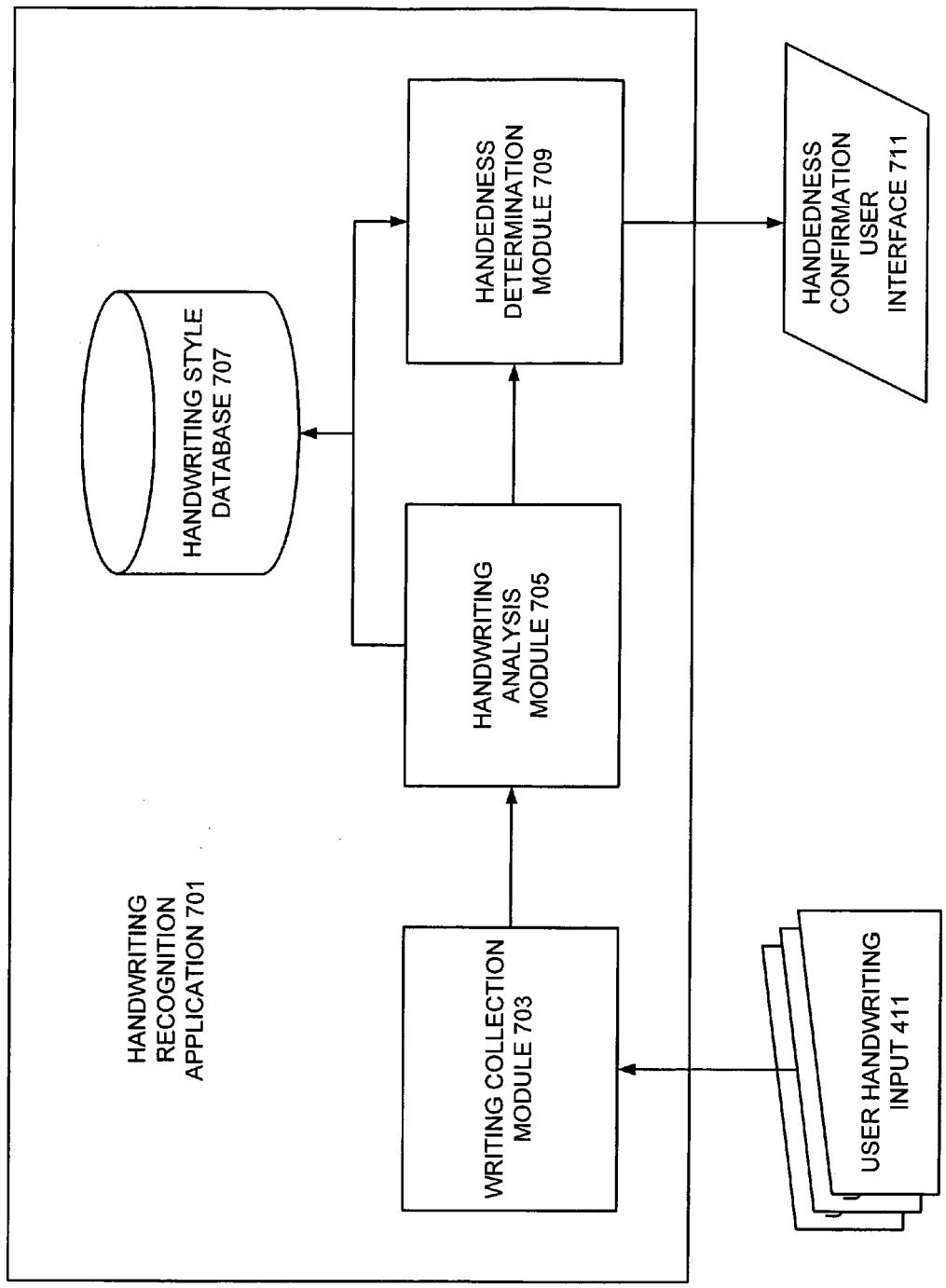
FIG. 7 illustrates a handwriting recognition tool that compares writing samples from a user with one or more handedness revealing allographs according to various examples of the invention.

Accordingly, the recognition training module 409 may provide a user with a writing recognition application, such as the handwriting recognition tool 701 shown in FIG. 7, which compares writing samples from the user with one or more handedness revealing allographs. As seen in this figure, the handwriting recognition application 701 includes a writing collection module 703 that receives handwriting input 411 from a user. It also includes a handwriting analysis module 705 that determines the handwriting style of the writing input 411. The handedness determination module 709 then compares the user's handwriting style with handedness revealing handwriting styles in the handwriting style database 707. Based upon the comparison, the handedness determination module 709 may determine the handedness of the user.

Figure 8:
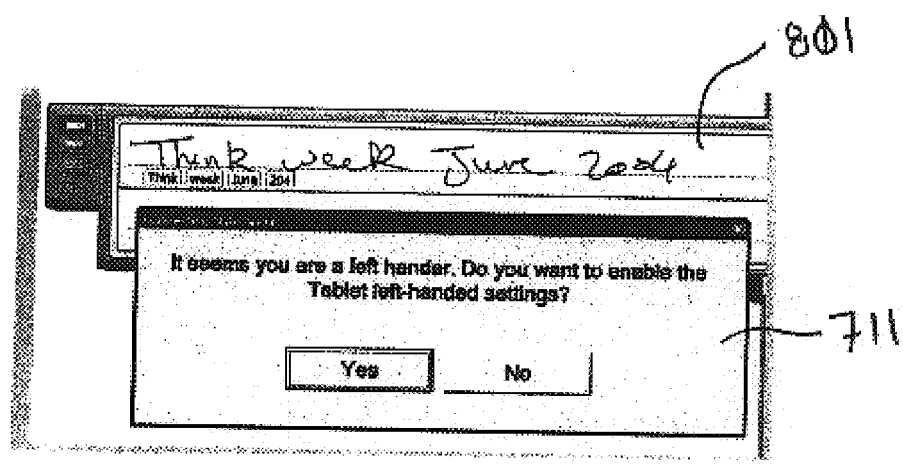
FIG. 8 illustrates a user interface prompting the user to confirm his or handedness that may be employed according to various examples of the invention.

With some examples of the invention, the handedness determination module 709 may simply conclude that the user has the determined handedness. Alternately, the recognition application may provide the user with a user interface 711 prompting the user to confirm his or her handedness. One example of this type of user interface is illustrated in FIG. 8. As seen in this figure, the recognition application 701 provides the user interface 711 in response to the user submitting handwriting samples to a text input panel user interface 801. Based upon a determination of handedness from the user's writing samples, the recognition application 701 may, for example, configure one or more user interfaces of the computer for the handedness of the user.

Community-Based Writing Recognition

Figure 9:
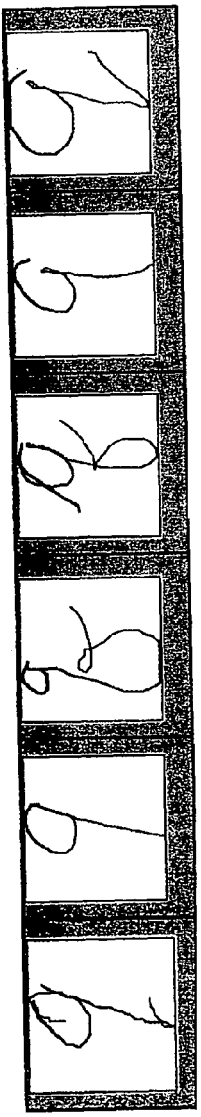
FIG. 9 illustrates the resulting styles for the letters "q", "t", and "x" obtained from performing a hierarchical clustering algorithm according to various examples of the invention to 71,600 ink samples corresponding to 99 letters written by 267 writers from the United States.
Figure 10:
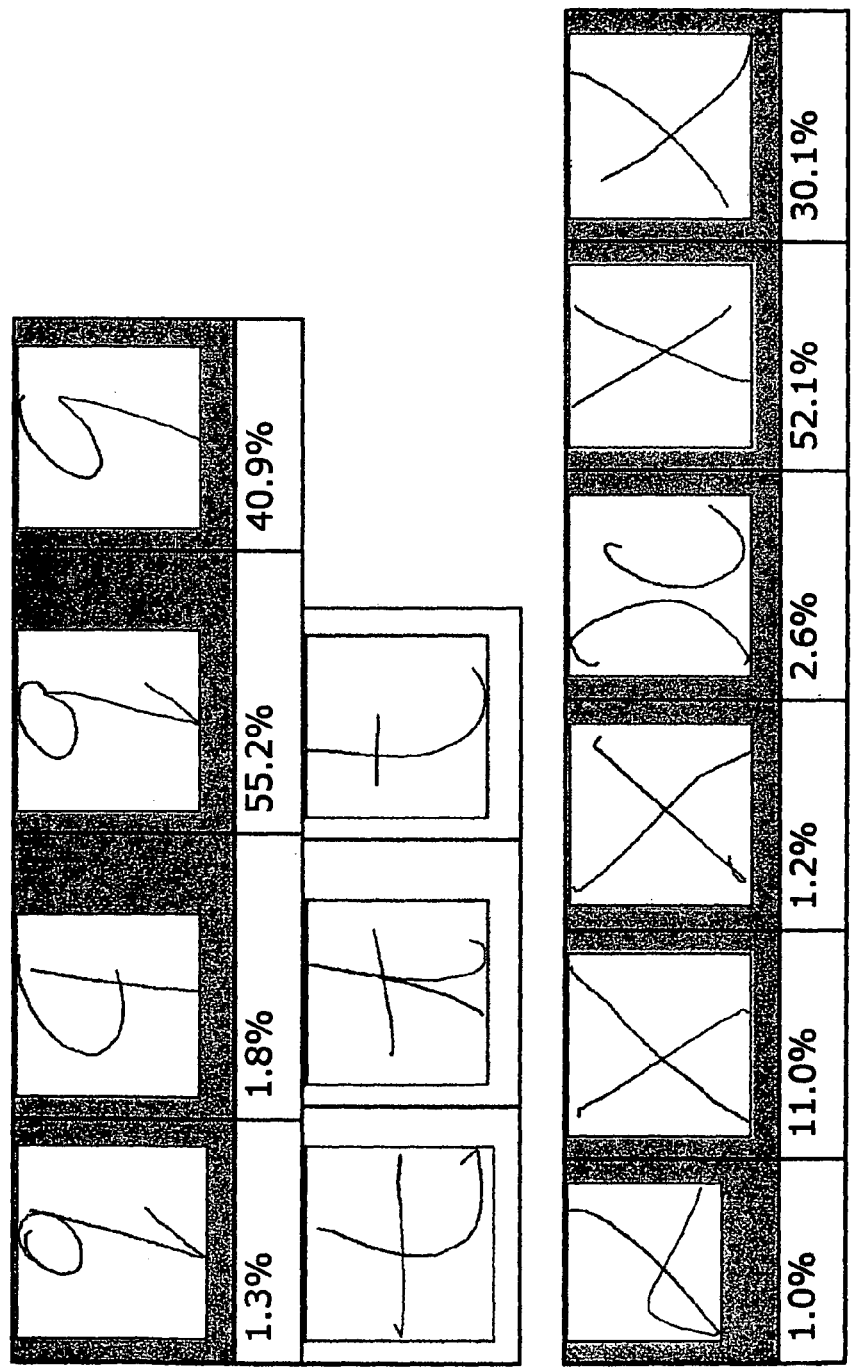
FIG. 10 illustrates the resulting styles for the letters "q", "t", and "x" obtained from performing a hierarchical clustering algorithm according to various examples of the invention to 70,000 ink samples corresponding to 99 letters written by 228 writers from the United Kingdom.

With various examples of the invention, the recognition training module 409 may use the data created by the style analysis module 405 to create a writing recognition application trained based upon handwriting styles or allographs distinctive to a geographic region, religious affiliation, ethnic background, cultural group, or any other type of community. For example, the hierarchical clustering algorithm described above was applied to 71,600 ink samples corresponding to 99 letters written by 267 writers from the United States. FIG. 9 illustrates the resulting styles for the letters "q", "t", "x", together with their relative frequencies after removing "noisy" clusters (i.e., clusters with a very low frequency of occurrence). The same experiment was repeated on a set of 70,000 ink samples corresponding to 99 letters written by 228 writers from the United Kingdom. FIG. 10 illustrates the resulting styles obtained from this data for the letters "q", "t", "x", together with their relative frequencies after removing "noisy" clusters.

From this experiment, it was determined that the dominant allographs for both geographic communities appear to be approximately the same for most characters, although the dominant allographs occur with different frequencies. Also, some fringe (i.e., low frequency) allographs appear to exist for one geographic community, but not for the other geographic community. Still further, even when a fringe allograph appears for both geographic communities, its frequency is significantly different between the geographic communities.

Figure 11:
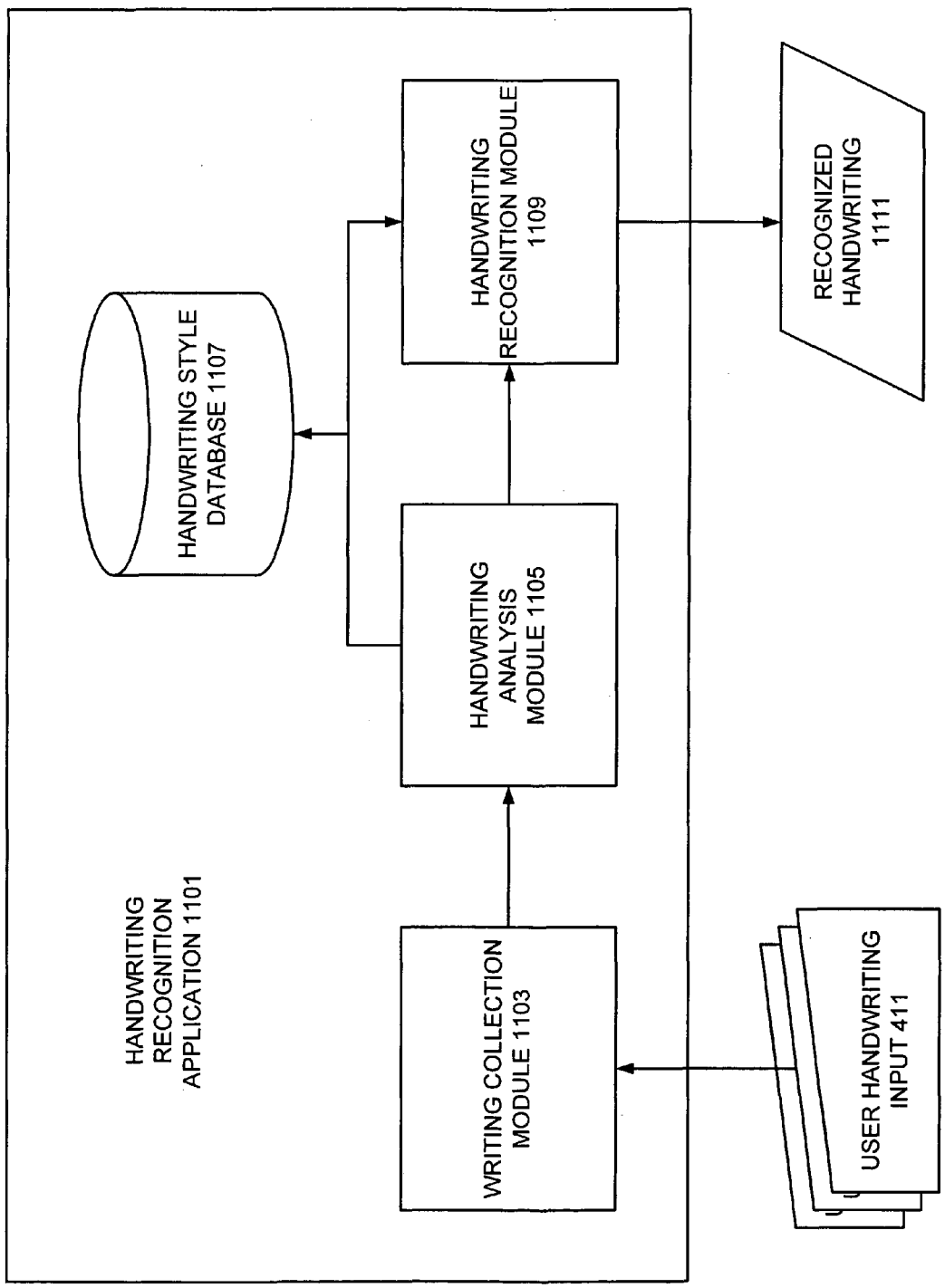
FIG. 11 illustrates a handwriting recognition application that has been specifically trained (or configured to be specifically trained) for the allographs common to the particular community in which it will be used.

Using this type of community-based allograph and handwriting style information obtained by the style analysis module 405, the recognition training module 409 may provide a user with a handwriting recognition application that has been specifically trained (or configured to be specifically trained) for the allographs common to the particular community in which it will be used. One such handwriting recognition tool 1101 is shown in FIG. 11. As seen in this figure, the handwriting recognition application 1101 includes a writing collection module 1103 that receives handwriting input 411 from a user. It also includes a handwriting analysis module 1105 that determines the handwriting style of the writing input 411. The handwriting recognition module 1109 then compares the user's handwriting style with one or more handwriting styles in the handwriting style database 1107, to determine, for example, if one or more allographs of the user's handwriting correspond to an allograph associated with a specific community, such as a community belonging to a particular geographic region.

Based upon this comparison, the handwriting recognition module 1109 can use the handwriting styles in the handwriting style database 1107 to recognize the current and future handwriting input 411 from the user. With some examples of the invention, the handwriting recognition module 1109 may simply conclude that the user belongs to a particular community. Alternately, the recognition application 1101 may provide the user with a user interface prompting the user to confirm that he or she belongs to a particular community.

Of course, allograph and handwriting style information obtained by the style analysis module 405 can be employed to provide community-specific handwriting recognition applications for any desired type of community that can be associated with an identifiable writing style, such as religious affiliation, ethnic background, cultural group, or any other type of community that may impact a user's handwriting style.

Style-Aware Recognition Training

The allograph and handwriting style information obtained by the style analysis module 405 also may be obtained to improve the training operation of various types of handwriting recognition applications, including conventional handwriting recognition applications. For example, allograph and handwriting style information obtained by the style analysis module 405 can be used to filter erroneous handwriting samples during the training process of handwriting recognition applications.

For example, in the above-described experiment, it was observed that there were clusters (i.e., allographs) that were composed mostly of noisy and bad ink samples. As a trend, however, these clusters primarily were of low cardinality. This is expected, since the noise hypotheses (or data outliers) are usually scattered and inconsistent. These cluster or allographs can therefore be considered insignificant allographs.

The impact of excluding these insignificant allographs from training a handwriting recognition application (i.e., excluding the insignificant allographs from the set of training characters used to train the handwriting recognition application) was measured. A desired threshold $O_{min}$ can be defined, below which a style is considered insignificant. As will be appreciated by those of ordinary skill in the art, the value that is selected for this threshold will be based upon the amount of permissible noise desired for the handwriting training set. To measure the impact of excluding these insignificant allographs on the recognition accuracy of a handwriting recognition application, 18,628 ink samples database written by 14 writers (two of which are left handed) were used. The individual error rates, as well the average error rate, then were compared for five different handwriting recognition applications. The first handwriting recognition application was trained on a full training set (i.e., a 100% recognizer). The second handwriting recognition application was trained on 15% of the full training set including the insignificant allographs. The three remaining handwriting recognition applications then were trained on 15% of the full training set, but excluding the insignificant allographs based upon different values of $O_{min}$.

Figure 12:
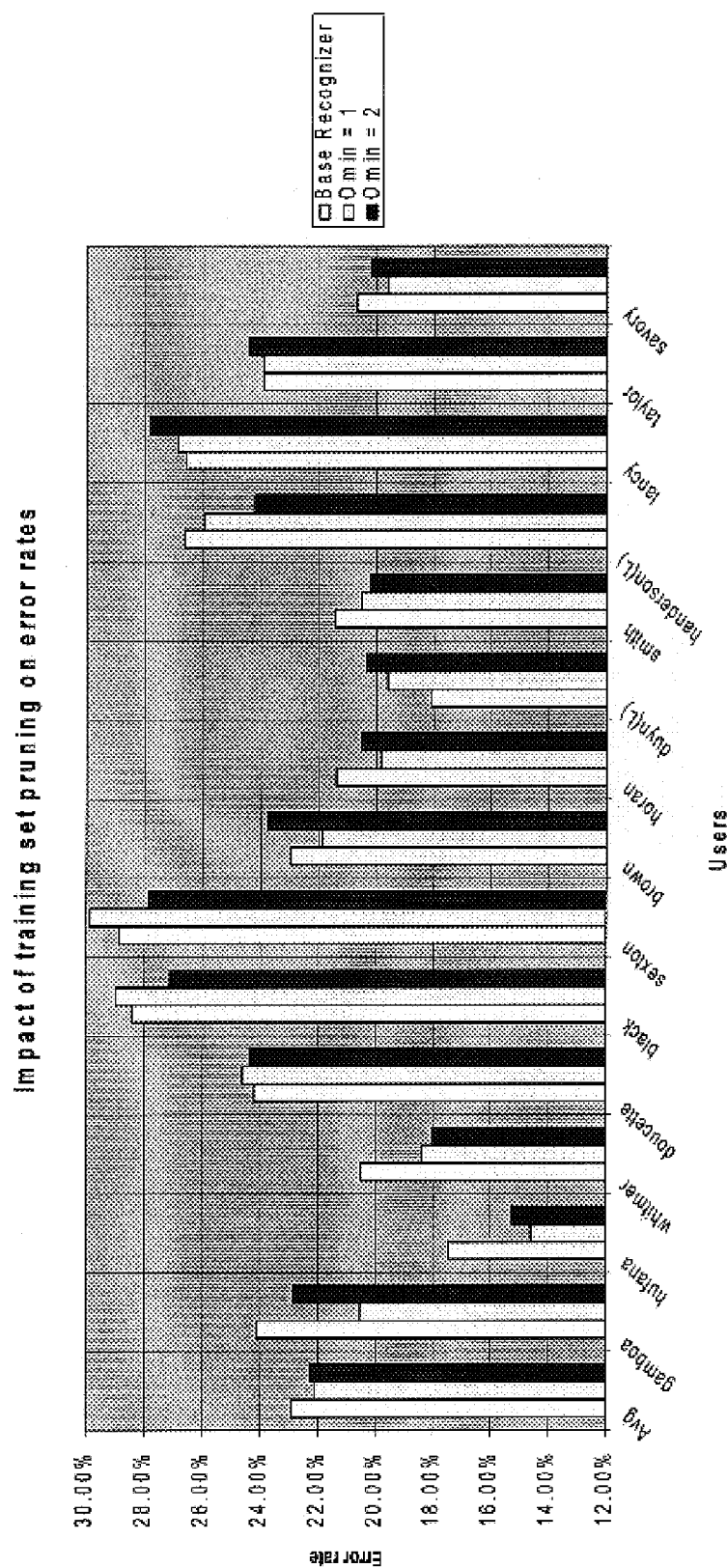
FIG. 12 illustrates changes in the testing error rate by excluding various levels of noise among different handwriting recognition applications.

FIG. 12 illustrates how the testing error rate changed with the value of $O_{min}$ among the different handwriting recognition applications. Based upon the results of the testing, it was noted that, for 10 out of 14 individuals and on the average, there was a "pruned" training set (i.e., a training set that excluded insignificant allographs) that produced a handwriting recognition application having a testing error rate lower than a corresponding "un-pruned" handwriting recognition application. Further, for 5 out of 14 writers, the testing error rate achieved by training on 15% of the data excluding the insignificant allographs was lower than the error rate achieved by training the handwriting recognition application on the full training set (i.e., 100% of the training set).

Accordingly, various examples of the invention may employ the handwriting styles identified by the style analysis module 405 to determine which allographs will be used by a handwriting recognition application 413 to train itself to more accurately recognize the handwriting recognition of a user. As will be appreciated by those of ordinary skill in the art, the value of $O_{min}$ can be experimentally selected to provide the most accurate set of training data based upon, for example the community for which the handwriting recognition application will be employed.

Personalized Handwriting Recognition

With still other examples of the invention, the recognition training module 409 may use the data obtained by the style analysis module 405 to create a writing recognition application that is specifically tailored to recognize a user's personal handwriting style (that is, the collection of allographs most commonly employed by the user).

Conventional handwriting recognition applications are based upon the discriminative classifier model. The classifiers used for these conventional handwriting recognition applications, including the single letter classifier, are typically trained with a training set that encompasses data collected from hundreds of writers. To personalize the handwriting recognition application for a specific writer, these classifiers are further trained on a small sample of writing data that the writer provides through explicit or implicit means. Usually, the writer specific training is performed for a limited number of iterations to guard against over training. This conventional approach to personalization will be referred to herein as "classical" personalization.

Various examples of the invention, however, may employ an alternative approach using the style information obtained by the style analysis module 405. This alternate approach will be referred to herein as "style based" personalization. More particularly, with this approach the recognition training module 409 employs ink samples provided by a user to compute the group of allographs typically employed by the user. This group of allographs makes up the user's handwriting style or "style membership vector." The vector then is used to compute the subset of the training set that best matches the writer's style. A classifier can then be trained on the computed subset of the training set.

To evaluate this style based personalization approach, an experiment was conducted that compared the performance of a handwriting recognition application trained using this approach to a base handwriting recognition application (i.e., a generic handwriting recognition application) and to a handwriting recognition application trained though classical personalization. A training set comprised 70,000 ink samples written by 267 writers was used to create the base handwriting recognition application. A set of 14 writers, two of which are left handed and none of which has any data in the training set, were targeted for the personalization experiment. Each of these writers had donated 2 ink samples for each of the 99 supported characters for personalization purposes, making a total of 198 ink sample. Each writer also had donated 14 samples for characters for testing purposes.

A handwriting recognition application was personalized for each of the writers by training a generic handwriting recognition application on the original training set augmented with the writer's personalization ink samples. As noted above, these handwriting recognition applications will be referred to as the classically personalized handwriting recognition applications. Another generic handwriting recognition application then was personalized for each of the writers by using the writer's personalization data to select the subset of the training set that matched the writer's handwriting style. That is, after performing style analysis on the training set, each of the writer's personalization ink samples was used to enable one of the allographs for each character in the training set. A handwriting recognition application was then trained for that writer on this subset of the training data augmented by the personalization ink samples. As noted above, these handwriting recognition applications are referred to as the style personalized handwriting recognition applications. Each of these three handwriting recognition applications was evaluated against the test set provided by each writer.

Figure 13:
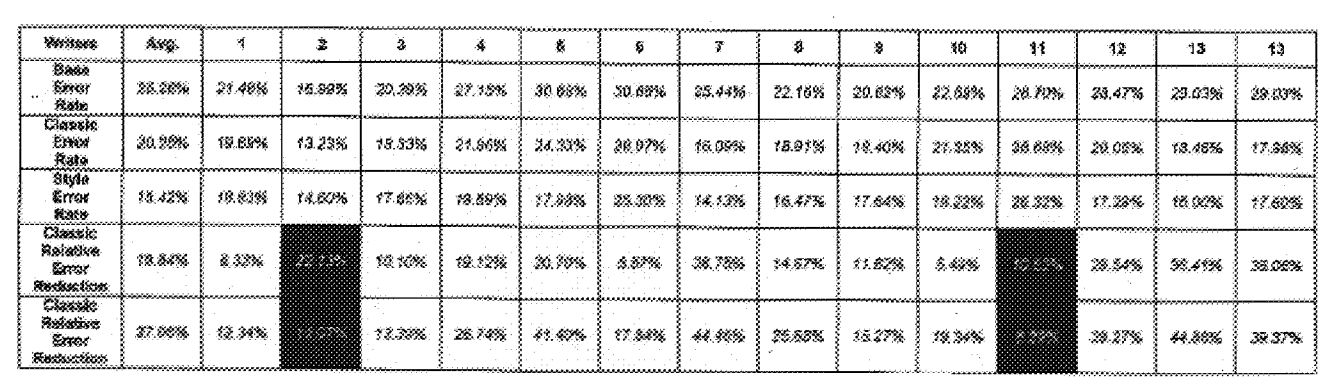
Figure 14:
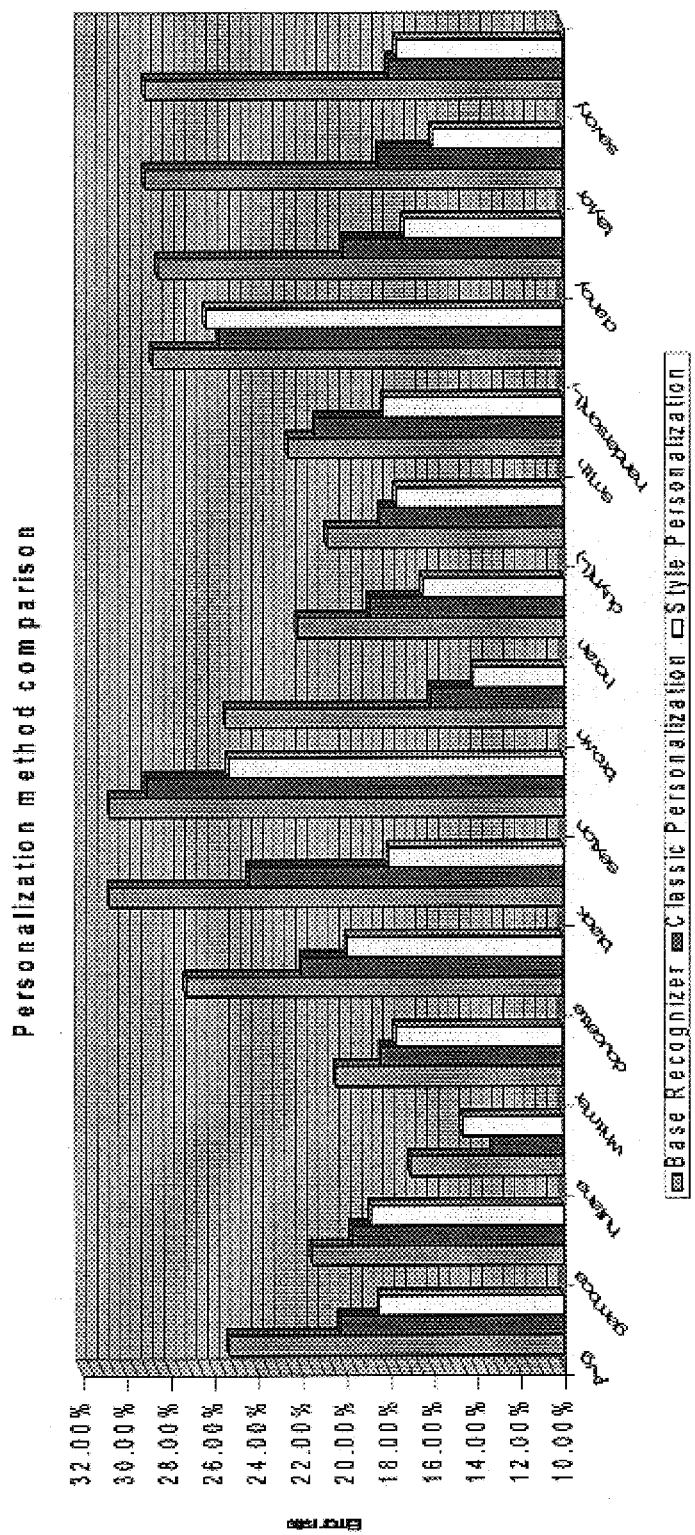

FIGS. 13 and 14 show the testing error rates for each of the three handwriting recognition applications mentioned above for each of the 14 writers targeted in this experiment, as well as the percentage of the training set that was selected to train the each style personalized handwriting recognition application. From these figures, it will be noted that, for each of the 14 writers, both the classically personalized handwriting recognition application and the style personalized handwriting recognition application decreased the testing error rate from that provided by the base recognizer. Also, for 12 writers, the style personalized handwriting recognition application provided a higher error reduction than that provided by the classically personalized handwriting recognition application.

Moreover, the average relative error reduction provided by the style personalized handwriting recognition application was around 27%, while it was only around 20% for the classically personalized handwriting recognition application. In addition, the average size of the portion of training set selected in the style based personalization was roughly 68% of the base training set.

Accordingly, after the style analysis module 405 has analyzed handwriting samples obtained from a user, the recognition training module 409 may use the data provided by the style analysis module 405 to create a style personalized writing recognition application that provides a higher degree of recognition accuracy for the user, while also requiring less training from the user to achieve the improved accuracy. More particularly, the writing style analysis tool 401 may provide the user with a handwriting recognition application 413 that employs a training set including or limited to allographs that correspond to the user's handwriting style.

Style Prediction

In addition to improving the training set of a handwriting recognition application, with various examples of the invention the writing style analysis tool 401 may alternately or additionally predict a user's writing style from the user's handwriting input 411 (and/or provide a handwriting recognition application that predict a user's writing style from the user's handwriting input 411). For example, the writing style analysis tool 401 may employ, e.g., collaborative filtering to predict how a writer would write some characters based upon collected ink samples of other characters.

Collaborative filtering is a known technique that is commonly used to predict a utility of items to a particular user based on a database of user votes from a sample or population of other users. Of particular relevance to the implementation of various examples of the invention is the class of collaborative filtering known as the memory-based algorithms.

With this type of collaborative filtering, a user database that consists of votes $v_{i,j}$ (corresponding to the vote for user i on item j) is used to predict the votes of an active user based on some partial information regarding a new user u and a set of weights calculated from the user database. It is assumed that the predicted vote of the new user u for item j is $P_{u,j}$. $P_{u,j}$ is a weighted sum of the votes of the other users in the database:

$$P_{u,j} = \alpha \sum_{i=1}^{N} w(u, i) \cdot v_{i,j}$$

where N is the number of users in the collaborative filtering database. The weights w(u,i) reflect the correlation or similarity between each user i and the user u. The value $\alpha$ is a normalizing factor to make sure that the votes sum to one.

The simplest and most common method for computing the weights is using the Pearson correlation coefficient. Using this coefficient, the correlation between users i and u is given by:

$$w(u, i) = \frac{\sum_{j} v_{u,j} \cdot v_{i,j}}{\sqrt{\sum_{j} v_{u,j}^2 \cdot \sum_{j} v_{i,j}^2}}$$

The summations over j are done over the items for which both users u and i voted.

In predicting a writer's handwriting style, the user database corresponds to the handwriting styles database, the user votes correspond to the writers' style membership vector values and user u, whose partial votes are known, corresponds to a writer whose partial style membership is known from input handwriting data and for whom the writing style analysis tool 401 (or handwriting recognition application 413) is required to predict the rest of the styles. With various examples of the invention, the writing style analysis tool 401 (or handwriting recognition application 413) may predict a user's writing style based upon, for example, the characters: a, A, I, 0, 1, 2, and 9, as these characters are distinctive and likely be captured during the every day use of the handwriting recognizer. Of course, alternate examples of the invention may employ any combination of characters to predict a user's writing style.

Figure 15:
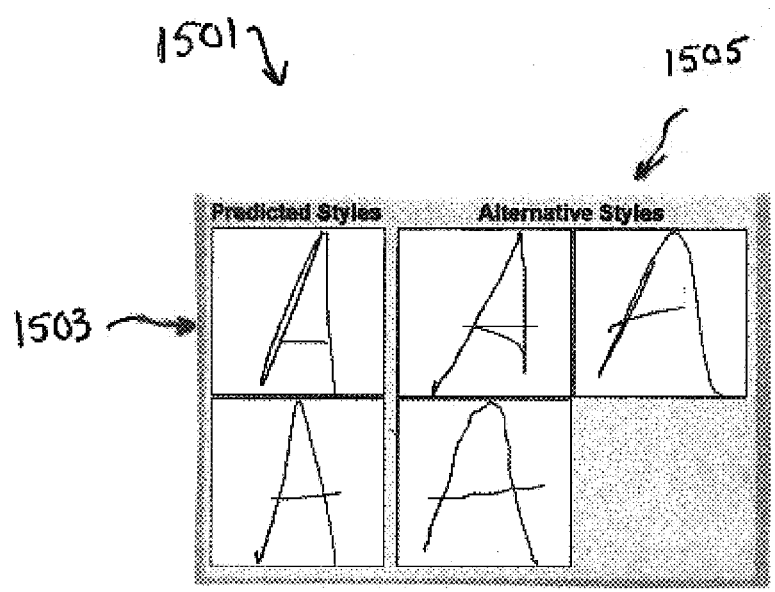
FIG. 15 illustrates a user interface prompting a user to confirm how he or she might write a particular character based upon the predicted handwriting style.

With some examples of the invention, the writing style analysis tool 401 (or handwriting recognition application 413) may simply predict that the user has a particular handwriting style, and employ the allographs making up this style to recognize the user's handwriting. Alternately, writing style analysis tool 401 (or handwriting recognition application 413) may provide the user with a user interface prompting the user to confirm how he or she might write a particular character based upon the predicted handwriting style. One example of this type of user interface is illustrated in FIG. 15. As seen in this figure, the user interface 1501 provides a primary selection of allographs 1503 within the writing style that most closely corresponds to the user's handwriting input. The user interface 1501 also may provide an alternative set of allographs 1505 within a writing style that also correspond to the user's handwriting input somewhat less than the primary selection of allographs. Based upon the determination of the user's handwriting style, the handwriting recognition application 413 can more accurately recognize the user's handwriting input, as discussed in detail above.

CONCLUSION

While the invention has been described with respect to specific examples including presently preferred modes of carrying out the invention, those skilled in the art will appreciate that there are numerous variations and permutations of the above described systems and techniques that fall within the spirit and scope of the invention as set forth in the appended claims.

What is claimed is:

1. A handwriting style analysis tool, comprising a computer-readable storage medium having encoded thereon computer-executable instructions which, when executed upon one or more computer processors, instantiates:
   a writing collection module that collects handwriting from a user; and
   a style analysis module that analyzes the collected handwriting to determine a style of the collected handwriting, wherein analyzing employs a hierarchical clustering algorithm which produces a hierarchy of nested clusterings, $C=\{c_1, c_2, \ldots c_m\}$, wherein for each pair $(c_i, c_{i+1})$ in C, $c_i$ is a subset of $c_{i+1}$, and each $c_{i+1}$ is obtained from the preceding $c_i$ by applying a cluster dissimilarity function to determine a difference between ink samples of handwriting.

2. The handwriting style analysis tool recited in claim 1, wherein the style analysis module further identifies a community associated with the collected handwriting.

3. The handwriting style analysis tool recited in claim 2, wherein the community is defined by a geographic region, a cultural group, or a religious affiliation.

4. The handwriting style analysis tool recited in claim 1, wherein the style analysis identifies a style that is idiosyncratic to the user.

5. A handwriting recognition application, comprising a computer-readable storage medium having encoded thereon computer-executable instructions which, when executed upon one or more computer processors, instantiates:
- a handwriting analysis module that analyzes handwriting collected from a user to determine a style of the collected handwriting, wherein determining a style comprises applying a hierarchical clustering algorithm which produces a hierarchy of nested clusterings, $C=\{c_1, c_2, \ldots c_m\}$, wherein for each pair $(c_i, c_{i+1})$ in C, $c_i$ is a subset of $c_{i+1}$ and each $c_{i+1}$ is obtained from the preceding $c_i$ by applying a cluster dissimilarity function to determine a difference between ink samples of handwriting;
- a handwriting style database containing handedness revealing writing styles; and
- a handedness determination module that compares the style of the collected handwriting with the handedness revealing writing styles to determine a handedness of the user.

6. The handwriting recognition application recited in claim 5, wherein the handwriting analysis module further provides an interface to the user prompting the user to confirm the determined handedness.

7. The handwriting recognition application recited in claim 5, wherein the handwriting analysis module configures a computer to operate based upon the determined handedness.

8. A method of training a handwriting recognition application, the method implemented in a computer environment comprising:
- using a computer processor and a computer-readable media to perform the following steps of:
- collecting handwriting from a plurality of writers;
- determining writing styles for the plurality of writers, wherein determining writing styles comprises applying a hierarchical clustering algorithm which produces a hierarchy of nested clusterings, $C=\{c_1, c_2, \ldots c_m\}$, wherein for each pair $(c_i, c_{i+1})$ in C, $c_i$ is a subset of $c_{i+1}$, and each $c_{i+1}$ is obtained from the preceding $c_i$ by applying a cluster dissimilarity function to determine a difference between ink samples of handwriting;
- selecting an ink sample for a particular cluster to be a representative of the particular cluster; and
- training a handwriting recognition application using training samples selected from at least one of the determined writing styles.

9. The method of training a handwriting recognition application recited in claim 8, further comprising training the handwriting recognition application using only training samples selected from at least one of the determined writing styles.

10. The method of training a handwriting recognition application recited in claim 8, further comprising
- analyzing handwriting collected from a user;
- associating at least one of the determined styles with the user; and
- training the handwriting recognition application using training samples selected from at least one of the determined writing styles associated with the user.

11. The method of training a handwriting recognition application recited in claim 10, wherein the associated at least one of the determined styles is a style common to a community.

12. The method of training a handwriting recognition application recited in claim 11, wherein the community is defined by a geographic region, a cultural group, or a religious affiliation.

13. The method of training a handwriting recognition application recited in claim 10, wherein the associating at least one of the determined styles is a style idiosyncratic to the user.

14. The method of training a handwriting recognition application recited in claim 10, wherein the associated at least one of the determined styles is a handedness revealing style.

15. The method of training a handwriting recognition application recited in claim 8, further comprising
- analyzing handwriting collected from a user;
- associating at least one of the determined styles with the user; and
- using the associated at least one of the determined styles to predict a writing style for characters written by the user.

16. The method of training a handwriting recognition application recited in claim 15, further comprising prompting a user to confirm the predicted writing style.

17. A method of training a handwriting recognition application, comprising:
- using a computer processor and a computer-readable media to perform the following steps of:
- collecting handwriting from a plurality of writers;
- determining writing styles for the plurality of writers;
- training a handwriting recognition application using training samples selected from at least one of the determined writing styles
- analyzing handwriting collected from a user;
- associating at least one of the determined styles with the user;
- using the associated at least one of the determined styles to predict a writing style for characters written by the user; and
- employing memory based collaborative filtering to predict a writing style for characters written by a user.

* * * * *